US008696308B2

(12) United States Patent
Denholm et al.

(10) Patent No.: US 8,696,308 B2
(45) Date of Patent: Apr. 15, 2014

(54) TURBOMACHINE

(75) Inventors: Tim Denholm, Leamington Spa (GB); James Alexander McEwen, Braghouse (GB); Tom J. Roberts, Huddersfield (GB); Robert L. Holroyd, Halifax (GB); Christopher Normington, Bradford (GB); Arun Vijayakumar, Huddersfield (GB); Stephen Edward Garrett, Huddersfield (GB)

(73) Assignee: Cummins Ltd., Huddersfield (GB)

( * ) Notice: Subject to any disclaimer, the term of this patent is extended or adjusted under 35 U.S.C. 154(b) by 699 days.

(21) Appl. No.: 12/899,298

(22) Filed: Oct. 6, 2010

(65) Prior Publication Data

US 2011/0194929 A1 Aug. 11, 2011

(30) Foreign Application Priority Data

| | | |
|---|---|---|
| Oct. 6, 2009 | (GB) | 0917513.4 |
| Apr. 6, 2010 | (GB) | 1005680.2 |
| Jul. 27, 2010 | (GB) | 1012536.7 |
| Jul. 27, 2010 | (GB) | 1012557.3 |
| Jul. 29, 2010 | (GB) | 1012734.8 |

(51) Int. Cl.

| | |
|---|---|
| ***F01B 25/02*** | (2006.01) |
| ***F03D 7/00*** | (2006.01) |
| ***F04D 15/00*** | (2006.01) |

(52) U.S. Cl.
USPC .......... 415/158

(58) Field of Classification Search
USPC ......... 415/151, 157, 158, 160, 165, 166, 167, 415/183, 184, 185, 186, 191, 203, 204, 206
See application file for complete search history.

(56) References Cited

U.S. PATENT DOCUMENTS

| | | | | |
|---|---|---|---|---|
| 4,886,416 | A * | 12/1989 | Wunderlich | 415/158 |
| 6,669,441 | B2 * | 12/2003 | Bertnik et al. | 415/158 |
| 7,428,814 | B2 * | 9/2008 | Pedersen et al. | 60/602 |
| 8,186,943 | B2 * | 5/2012 | Fledersbacher et al. | 415/158 |

* cited by examiner

*Primary Examiner* — Edward Look
*Assistant Examiner* — Christopher J Hargitt
(74) *Attorney, Agent, or Firm* — Krieg DeVault LLP; Clifford W. Browning

(57) ABSTRACT

According to a first aspect of the present invention there is provided a variable geometry turbine comprising: a turbine wheel mounted for rotation about a turbine axis within a housing, the housing defining an annular inlet surrounding the turbine wheel and defined between first and second inlet sidewalls, the annular inlet being divided into at least two axially offset inlet portions; a cylindrical sleeve axially movable across the annular inlet to vary the size of a gas flow path through the inlet; and a guide for guiding the movement of the cylindrical sleeve, the guide being at least partially located within the inlet at a radially extent of the inlet portions, and extending in an axial direction parallel to the turbine axis.

9 Claims, 7 Drawing Sheets

TURBOMACHINE

CROSS REFERENCE TO RELATED APPLICATIONS

The present application claims priority to United Kingdom Patent Application No. 1012734.8 filed Jul. 29, 2010, United Kingdom Patent Application No. 1012536.7 filed Jul. 27, 2010, United Kingdom Patent Application No. 1012557.3 filed Jul. 27, 2010, United Kingdom Patent Application No. 1005680.2 filed Apr. 6, 2010, and United Kingdom Patent Application No. 0917513.4 filed Oct. 6, 2009, each of which is incorporated herein by reference.

The present invention relates to a turbine suitable for, but not limited to, use in turbochargers and variable geometry turbochargers.

Turbochargers are well known devices for supplying air to the intake of an internal combustion engine at pressures above atmospheric pressure (boost pressures). A conventional turbocharger essentially comprises a housing in which is provided an exhaust gas driven turbine wheel mounted on a rotatable shaft connected downstream of an engine outlet manifold. A compressor impeller wheel is mounted on the opposite end of the shaft such that rotation of the turbine wheel drives rotation of the impeller wheel. In this application of a compressor, the impeller wheel delivers compressed air to the engine intake manifold. A power turbine also comprises an exhaust gas driven turbine wheel mounted on a shaft, but in this case the other end of the shaft is not connected to a compressor. For instance, in a turbocompound engine, two turbines are provided in series, both driven by the exhaust gases of the engine. One turbine drives a compressor to deliver pressurised air to the engine and the other, the “power turbine”, generates additional power which is then transmitted to other components via a mechanical connection, such as a gear wheel to transmit power to the engine crankshaft, or via other types of connection, for instance a hydraulic or electrical connection.

It is an object of the present invention to obviate or mitigate one or more of the problems associated with existing turbines.

According to a first aspect of the present invention there is provided a variable geometry turbine comprising: a turbine wheel mounted for rotation about a turbine axis within a housing, the housing defining an annular inlet surrounding the turbine wheel and defined between first and second inlet sidewalls, the annular inlet being divided into at least two axially offset inlet portions; a cylindrical sleeve axially movable across the annular inlet to vary the size of a gas flow path through the inlet; and a guide for guiding the movement of the cylindrical sleeve, the guide being at least partially located within the inlet at a radially extent of the inlet portions, and extending in an axial direction parallel to the turbine axis.

The guide comprises one or more elongate members (e.g. rods or rails).

The one or more elongate members may be located at an outer radially extent of the inlet portions if the sleeve has an inner diameter that is greater than an outer diameter of inlet portions.

The one or more elongate members are located at an inner radially extent of the inlet portions if the sleeve has an outer diameter that is less than an inner diameter of inlet portions The variable geometry turbine may further comprise: one or more vanes located in one or both inlet portions, the one or more vanes dividing an inlet portion into at least two inlet passages, and wherein the guide may comprise: one or more edges of the one or more vanes.

If the sleeve has an inner diameter greater than an outer diameter of the inlet portions, the one or more edges may be a leading edge, or may be leading edges, of the one or more vanes.

If the sleeve has an outer diameter that is less than an inner diameter of the inlet portions, the one or more edges may be a trailing edge, or may be trailing edges, of the one or more vanes.

According to a second aspect of the present invention there is provided a variable geometry turbine comprising: a turbine wheel mounted for rotation about a turbine axis within a housing; the housing defining an annular inlet surrounding the turbine wheel and defined between first and second inlet sidewalls, the annular inlet being divided into at least two axially offset inlet portions by a baffle, an inlet portion being divided into at least two inlet passages by a vane; and a cylindrical sleeve axially movable across the annular inlet to vary the size of a gas flow path through the inlet; wherein one or more of: a portion of an extremity of the baffle, a portion of an extremity of the vane and/or a leading end of the sleeve is provided with an inclined surface for facilitating movement of the sleeve across the baffle and/or vane.

An inner diameter of the sleeve may be greater than an outer diameter of the inlet portion, and wherein: one or more of: a radially outer portion of the baffle, a radially outer portion of the vane and/or a radially inner portion of a leading end of the sleeve may be provided with an inclined surface for facilitating movement of the sleeve across the baffle and/or vane.

The vane may extend to a greater radial extent than the baffle, and at least the vane may be provided with the inclined surface.

The vane may extend to a greater radial extent than the baffle, and a leading end of the sleeve may be provided with one or more discrete (i.e. not extending around the entire circumference of the sleeve) inclined surfaces distributed around a circumference of the sleeve, the location or locations of which coincide with a location of a vane.

The baffle may extend to a greater radial extent than the vane, and at least the baffle may be provided with the inclined surface.

The inclined surface may be one or more of a bevel, a chamfer and/or a rounded edge.

According to a third aspect of the present invention there is provided a variable geometry turbine comprising: a turbine wheel mounted for rotation about a turbine axis within a housing, the housing defining an annular inlet surrounding the turbine wheel and defined between first and second inlet sidewalls, the annular inlet being divided into at least two axially offset inlet portions; a cylindrical sleeve structure axially movable across the annular inlet to vary the size of a gas flow path through the inlet; and wherein the cylindrical sleeve structure extends across the entire width of the inlet, such that a first end of the sleeve structure is supported within or by the first inlet side wall, or a body defining that wall, and a second opposite end of the sleeve structure is supported within or by the second sidewall, or a body defining that wall; and wherein the sleeve structure comprises one or more apertures locatable within the inlet to, upon movement of the sleeve structure, vary the size of a gas flow path through the inlet.

The sleeve structure may comprise a sleeve provided with the one or more apertures.

The sleeve structure may comprise a sleeve section and one or more support struts.

The sleeve structure may comprise a first sleeve section, and a second sleeve section, the first and second sleeve sections being joined and axially separated by one or more support struts.

The one or more support struts may be attached to the sleeve section, and/or the first sleeve section, and/or the second sleeve section.

The one or more support struts may be integral to (e.g. formed integrally with) the sleeve section, and/or the first sleeve section, and/or the second sleeve section.

The one or more support struts may be aligned with leading or trailing edges of vanes provided in one or both inlet portions. The one or more apertures may be alienable with one or more inlet passages defined (e.g. by vanes or other structures) in the one or more inlet portions.

According to a fourth aspect of the present invention there is provided a variable geometry turbine comprising: a turbine wheel mounted for rotation about a turbine axis within a housing, the housing defining an annular inlet surrounding the turbine wheel and defined between first and second inlet sidewalls, the annular inlet being divided into at least two axially offset inlet portions; a sleeve assembly, comprising a sleeve that is movable in a direction parallel to the turbine axis and across the annular inlet to vary the size of a gas flow path through the inlet, and an actuator for moving the sleeve; wherein a helical interface is present in the sleeve assembly, the helical interface being arranged to induce, in use, helical movement of a part of the sleeve assembly.

The actuator, or a part thereof, may form a part of, or be provided on or in, the sleeve itself.

The sleeve may comprise the helical interface, and the sleeve is arranged to move helically.

The actuator may comprise a rotatable collar that surrounds, or is surrounded by, the sleeve, the rotatable collar being fixed in position in an axial direction, and rotatable to move the sleeve helically.

At least a part of the actuator comprises the helical interface, and the sleeve is arranged to move axially, and/or helically.

The sleeve may comprise a helical groove or slit, and the actuator may comprise: a rotatable collar that surrounds, or is surrounded by, the sleeve, the rotatable collar being fixed in position in an axial direction, and the rotatable collar being provided with a helical groove or slit; and a helically or axially moveable annulus located in-between the sleeve and the rotatable collar, the annulus housing one or more bearings configured to sit in the helical groove or slit of the rotatable collar, and to sit in the helical groove or slit provided in the sleeve, the helical groove or slit of the sleeve, and the helical groove or slit of the rotatable collar, having different handedness.

The sleeve may comprise a helical groove or slit, and the actuator may comprise: a collar that surrounds, or is surrounded by, the sleeve, the collar being fixed in position, and the collar being provided with a helical groove or slit; and a helically moveable annulus located in-between the sleeve and the collar, the annulus housing one or more bearings configured to sit in the helical groove or slit of the rotatable collar, and to sit in the helical groove or slit provided in the sleeve, the helical groove or slit of the sleeve, and the helical groove or slit of the collar, having the same handedness.

One or more of the collar, rotatable collar and/or sleeve may be provided with a plurality of helical grooves or slits, disposed around a circumference of the respective collar, rotatable collar and/or sleeve.

The sleeve assembly may further comprise a guide or driver for guiding or driving movement of the sleeve in an axial and/or helical manner.

Any one or more of the above aspects, or features thereof, may be combined with other aspects, or features thereof, where appropriate.

Advantageous and preferred features of the invention will be apparent from the following description.

Specific embodiments of the present invention will now be described, by way of example only, with reference to the accompanying drawings, in which.

Figure 7:
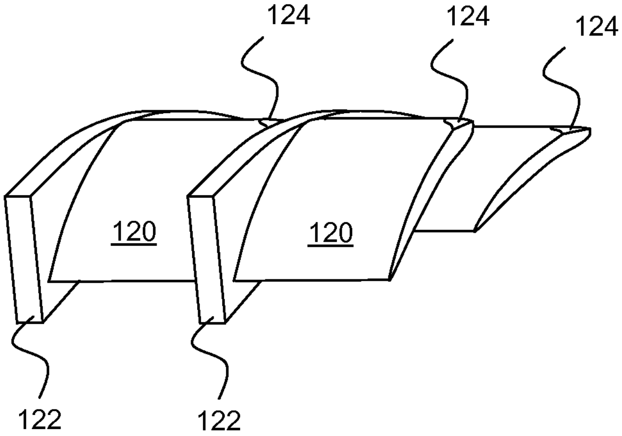
Figure 8:
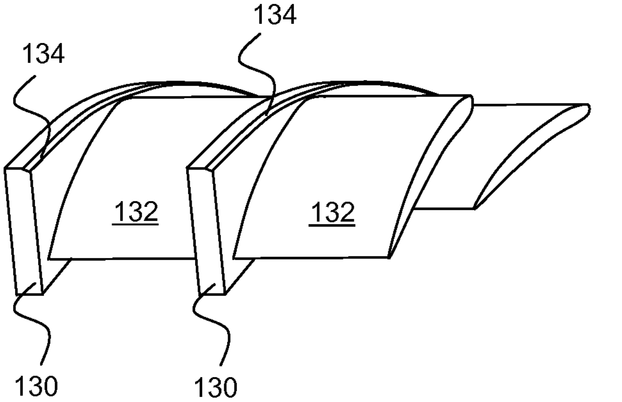
Figure 9:
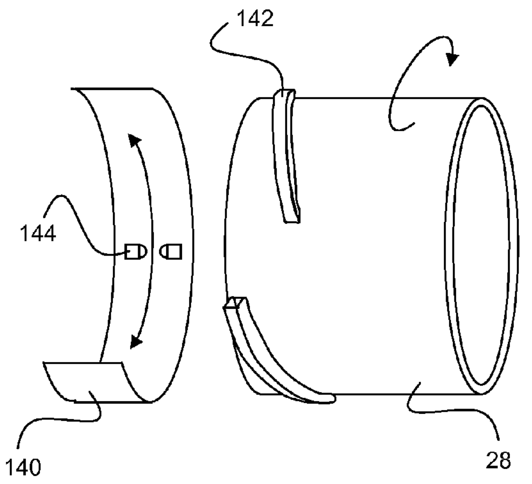
Figure 10:
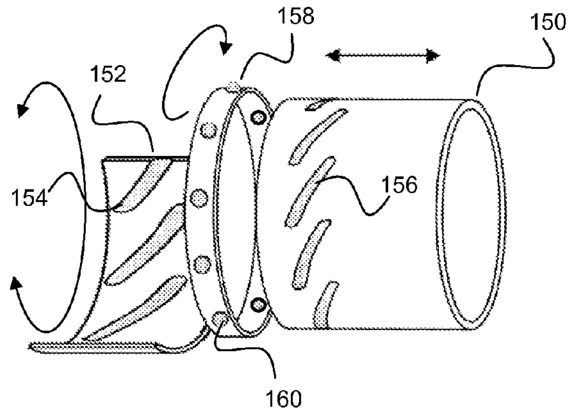
Figure 11:
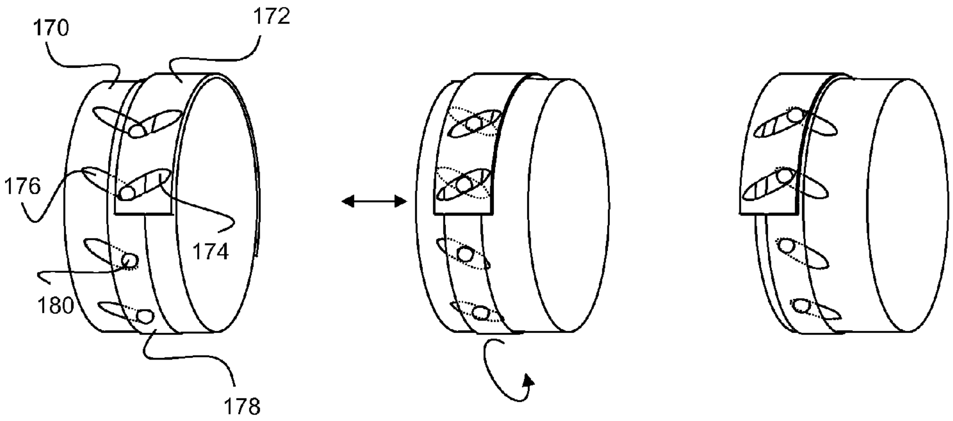
Figure 12:
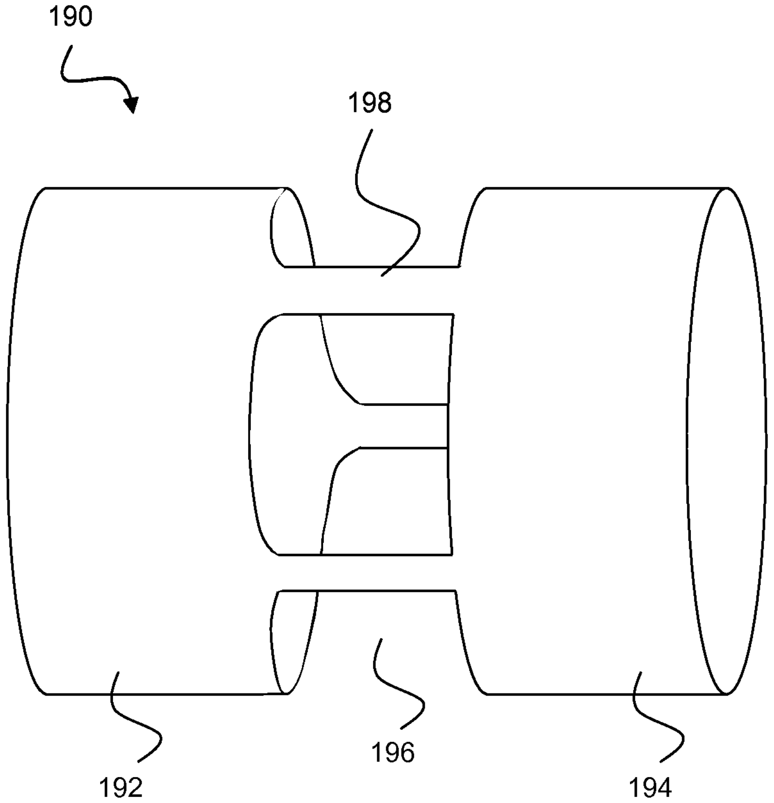
Figure 13:
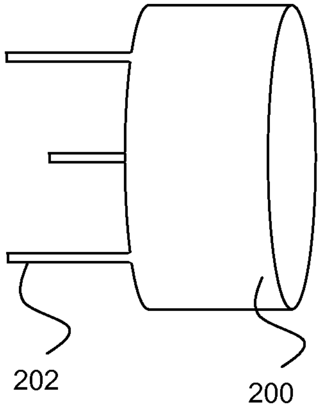
Figure 14:
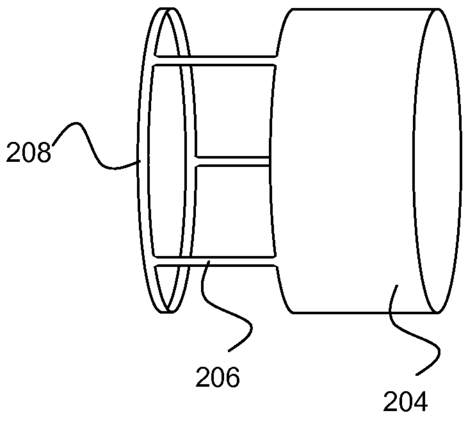
Figure 15:
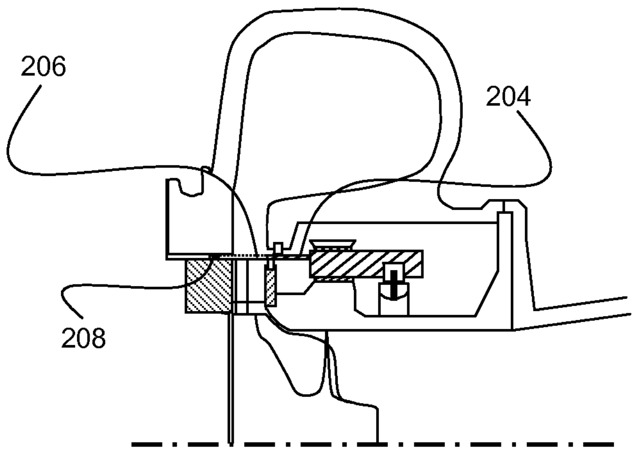

FIGS. 6*a* to 6*e* depict different examples of inclined surfaces that may be used in accordance with embodiments of the present invention;

FIG. 7 is a perspective view of vanes provided with inclined surfaces, in accordance with an embodiment of the present invention;

FIG. 8 is a perspective view of baffles provided with inclined surfaces, in accordance with an embodiment of the present invention FIG. 9 is a perspective view of a sleeve assembly in accordance with an embodiment of the present invention;

FIG. 10 is a perspective view of a sleeve assembly in accordance with another embodiment of the present invention;

FIG. 11 is a perspective view of a sleeve assembly, in different operating positions, in accordance with a further embodiment of the present invention;

FIG. 12 schematically depicts a sleeve structure in accordance with another embodiment of the present invention;

FIG. 13 schematically depicts a sleeve structure in accordance with further embodiment of the present invention;

FIG. 14 schematically depicts a sleeve structure in accordance with a yet further embodiment of the present invention; and FIG. 15 schematically depicts a section of a turbine incorporating the sleeve structure shown in FIG. 14.

Figure 1:
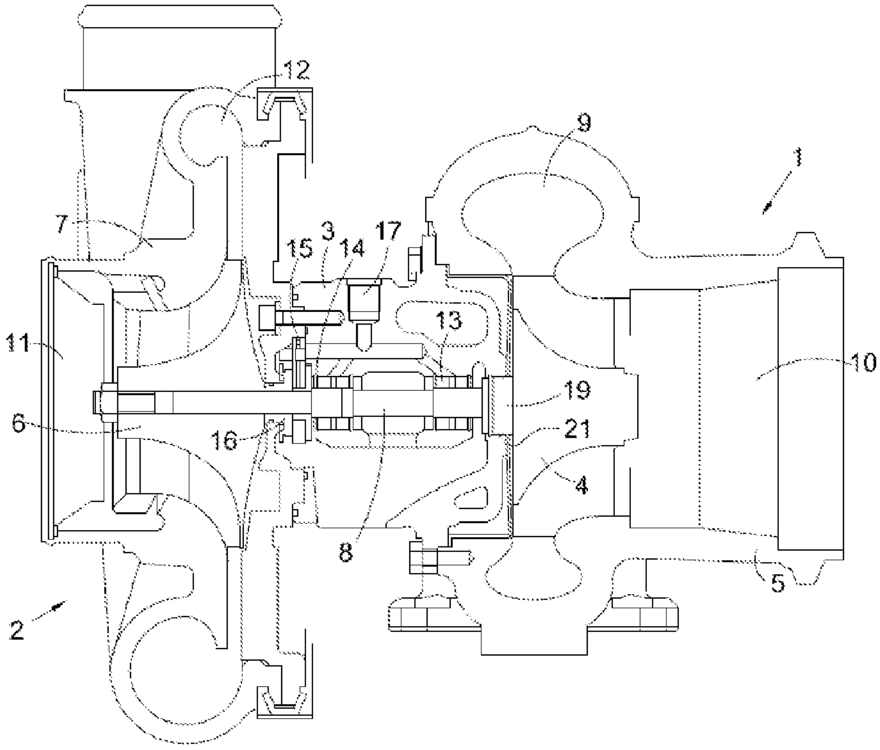
FIG. 1 is an axial cross-section through a conventional turbocharger.

Referring to FIG. 1, the turbocharger comprises a turbine 1 joined to a compressor 2 via a central bearing housing 3. The turbine 1 comprises a turbine wheel 4 for rotation within a turbine housing 5. Similarly, the compressor 2 comprises a compressor wheel 6 which can rotate within a compressor housing 7. The turbine wheel 4 and compressor wheel 6 are mounted on opposite ends of a common turbocharger shaft 8 which extends through the central bearing housing 3.

The turbine housing 5 has an exhaust gas inlet volute 9 located annularly around the turbine wheel 4 and an axial exhaust gas outlet 10. The compressor housing 7 has an axial air intake passage 11 and a compressed air outlet volute 12 arranged annularly around the compressor wheel 6. The turbocharger shaft 8 rotates on journal bearings 13 and 14 housed towards the turbine end and compressor end respectively of the bearing housing 3. The compressor end bearing 14 further includes a thrust bearing 15 which interacts with an oil seal assembly including an oil slinger 16. Oil is supplied to the bearing housing from the oil system of the internal combustion engine via oil inlet 17 and is fed to the bearing assemblies by oil passageways 18.

In use, the turbine wheel 4 is rotated by the passage of exhaust gas from the annular exhaust gas inlet 9 to the exhaust gas outlet 10, which in turn rotates the compressor wheel 6 which thereby draws intake air through the compressor inlet 11 and delivers boost air to the intake of an internal combustion engine (not shown) via the compressor outlet volute 12.

Figure 2:
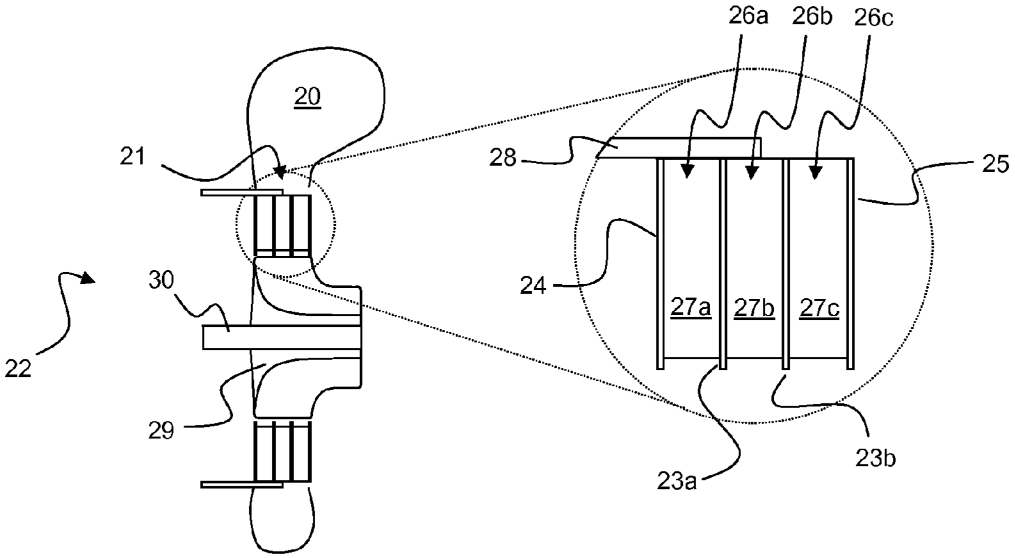
FIG. 2 is an axial cross-section through a turbine volute and annular inlet of a turbine according to an embodiment of the present invention.

In FIG. 2 there is shown a turbine volute 20 and an annular inlet 21 of a turbine 22 according to an embodiment of the present invention. Equiaxially spaced across the inlet 21 are two annular baffles 23*a*, 23*b* which, together with inner and outer sidewalls 24, 25 of the inlet, define three axially offset annular inlet portions 26*a*, 26*b*, 26*c* of equal axial width. Extending axially across each of the three inlet portions 26*a*, 26*b*, 26*c* are respective annular arrays of vanes 27*a*, 27*b*, 27*c*. The vanes 27*a*, 27*b*, 27*c* are optional, and in other embodiments may not be present in all inlet portions 26*a*, 26*b*, 26*c*. The vanes 27*a*, 27*b*, 27*c* divide each respective inlet portion 26*a*, 26*b*, 26*c* to form inlet passages in each inlet portion 26*a*, 26*b*, 26*c*. A cylindrical sleeve 28 is provided that is axially movable across the annular inlet 21 to vary the size of a gas flow path through the inlet 21 (i.e. to vary the geometry of the turbine). Movement of the cylindrical sleeve 28 may be undertaken, for example, to close or at least partially close, or open, or at least partially open, one or more of the inlet portions 26*a*, 26*b*, 26*c*.

The turbine 22 is also shown as comprising a turbine wheel 29 mounted on a turbine shaft 30 for rotation about a turbine axis.

Figure 3:
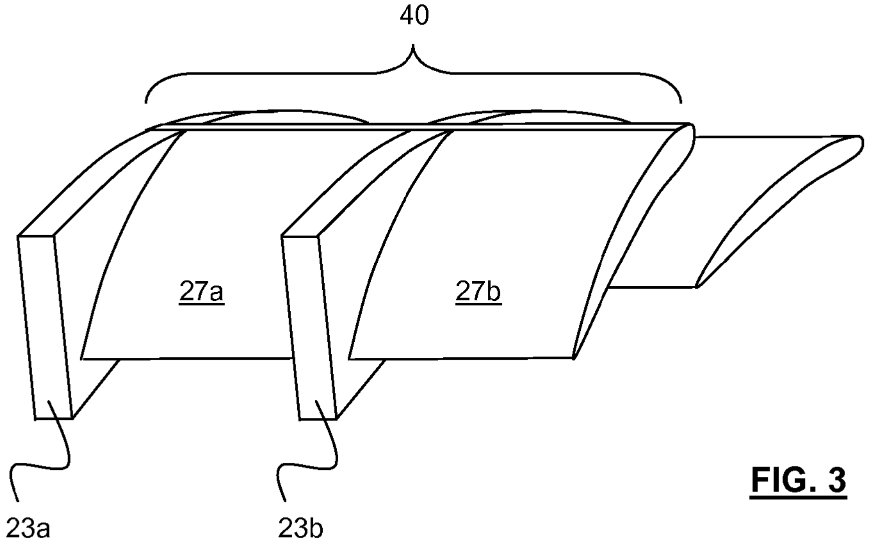
FIG. 3 is a perspective view of baffles, vanes and a guide for guiding movement of a sleeve, in accordance with an embodiment of the present invention.

Movement of the sleeve 28 in the axial direction may result in the sleeve 28 impacting one or more of the baffles 23*a*, 23*b* or vanes 27*a*, 27*b*, 27*c*. Such impact may result in jamming or sticking of the sleeve 28, which is undesirable. According to an embodiment of the present invention, this problem may be at least partially overcome by providing a guide (which may be referred to as a running guide) for guiding the axial movement of the cylindrical sleeve 28. The guide is at least partially located within the annular inlet at a radially extent of the inlet portions 26*a*, 26*b*, 26*c*, and extends in a substantially axial direction, parallel to the turbine axis. The guide may be located at a radially outer or inner extent of the inlet portions 26*a*, 26*b*, 26*c*, depending on the configuration of the sleeve 28. The arrangement shown in FIG. 2 comprises such a guide, although this guide is not visible in the Figure. FIG. 3 is used to describe the guide.

FIG. 3 is a perspective view of baffles 23*a*, 23*b* and vanes 27*b*, 27*c*. A guide 40 is shown as comprising leading edges of the vanes 27*b*, 27*c*, the edges being at an outer radial extent of inlet portions defined by the baffles 23*a*, 23*b*. The leading edges of the vanes 27*b*, 27*c* extend in a linear, substantially continuous manner, parallel to the turbine axis. The continuity is only broken by the presence of the baffles 23*a*, 23*b*, the radially outer extent of which is preferably flush with the edges of the vanes 27*b*, 27*c* that form the guide 40. In use, the sleeve may be moved along the guide 40.

In this embodiment, the sleeve has an inner diameter greater than an outer diameter of the inlet portion—i.e. the sleeve surrounds the inlet portions. If, in for example another embodiment, the sleeve has an outer diameter that is less than an inner diameter of the inlet portions—i.e. the inlet portions surround the sleeve—the one or more vane edges may be trailing edges, for example defining a guide at an inner radial extent of the vanes and/or inlet portions.

Figure 4:
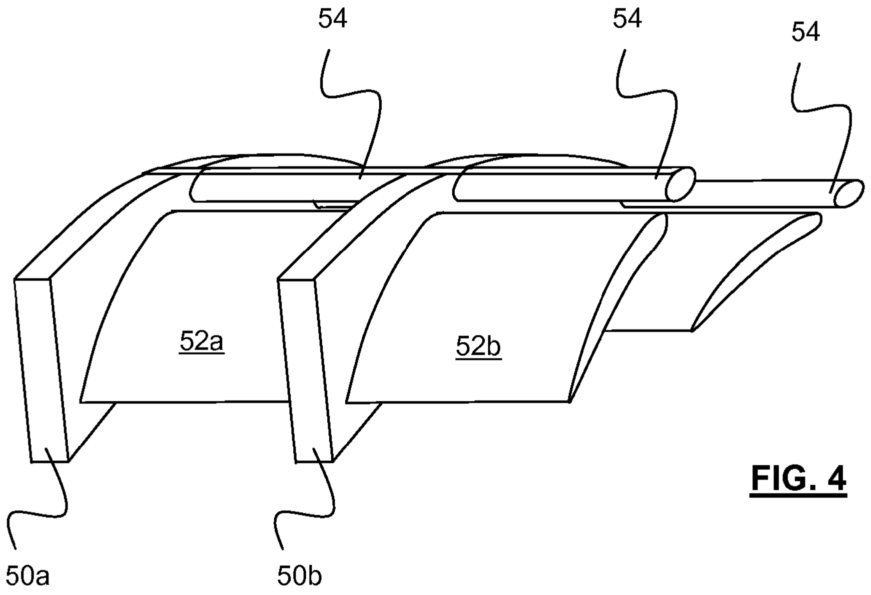
FIG. 4 is a perspective view of baffles, vanes and a guide for guiding movement of a sleeve, in accordance with another embodiment of the present invention.
Figure 5:
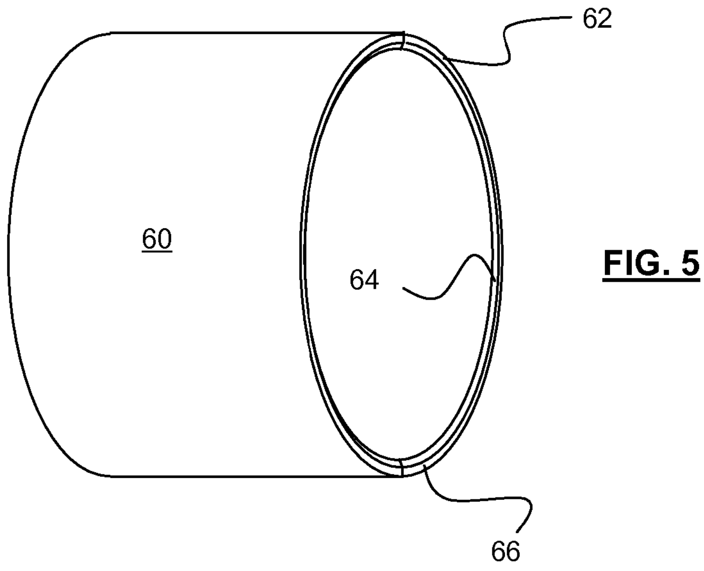
FIG. 5 is a perspective view of a sleeve in accordance with an embodiment of the present invention.

FIG. 4 schematically depicts another embodiment of the present invention. FIG. 4 is a perspective view of baffles 50*a*, 50*b* and vanes 52*a*, 52*b*. A guide is shown as comprising elongate members 54. The elongate members 54 are located at an outer radially extent of the inlet portions defined by the baffles 50*a*, 50*b*. A plurality of elongate members 54 are provided which are aligned in a linear, substantially continuous manner in between baffles 50*a*, 50*b*, extending parallel to the turbine axis. The continuity is only broken by the presence of the baffles 50*a*, 50*b*, the radially outer extent of which is preferably flush with an outer radial extent of the elongate members 54 that form the guide. In use, the sleeve may be moved along the guide.

The guide or guides in the form of elongate members (which are, in generally axially extending) may undesirably affect the flow of gas through the inlet. To minimise this undesirable effect, the guide or guides may be aligned with leading or trailing edges of vanes or other structures (preferably axially extending) provided in one or both inlet portions or passages in those portions.

In another, related embodiment, an elongate member, or a plurality of elongate members may not extend between baffles. Instead, the members may extend across one or more baffles, so that the radially outer extent of the baffles does not need to be flush with an outer radial extent of the elongate members that form the guide.

In the embodiment shown in FIG. 4, the sleeve has an inner diameter greater than an outer diameter of the inlet portions—i.e. the sleeve surrounds the inlet portions. If, in for example another embodiment, the sleeve has an outer diameter that is less than an inner diameter of the inlet portions—i.e. the inlet portions surround the sleeve—the one or more elongate members may be located at an inner radially extent of the inlet portions.

Locating the guide of the present invention at least partially within the inlet ensures that the sleeve is properly guided within the inlet itself, where forces due to gas flow are greatest and where impact of the sleeve with vanes or baffles might otherwise occur. The sleeve might also be guided by a channel or the like in a housing of the turbine, for example. However, a guide in the housing might, alone, be insufficient to prevent impact of the sleeve with vanes or baffles in the inlet.

In any embodiment, a single guide extending in an axial direction may be provided. More than one guide may be provided, for example diametrically opposed guides, or guides located at certain locations around the inlet (e.g. three, four, five or more equally space locations, or at the location of a leading edge of a vane, at the location of each vane, or at the location of a group of vanes). A single guide may, instead, be understood as comprising sub-guides or guide parts or the like, which for example may be diametrically opposed sub-guides or guide parts, or sub-guides or guide parts that are located at certain locations around the inlet (e.g. three, four, five or more equally space locations, or at the location of a leading edge of a vane, at the location of each vane, or at the location of a group of vanes).

Although not visible in FIG. 2, one, more or all of a portion of an extremity of the baffles 23*a*, 23*b*, a portion of an extremity of the vanes 27*a*, 27*b*, 27*c* and/or a leading end of the sleeve 28 may be provided with an inclined surface for facilitating movement of the sleeve 28 across the baffle 23*a*, 23*b* and/or vane 27*a*, 27*b*, 27*c*. The inclined surface is provided on a surface which might contact with the sleeve 28, vane 27*a*, 27*b*, 27*c* and/or baffle 23*a*, 23*b*.

Without such an inclined surface, the sleeve 28 might be more likely to come up against a more readily opposable surface (e.g. two flat faces or edges coming together), which might cause the sleeve 28 to jam, or which might at least cause sticking of the sleeve 28, or excessive wear of the sleeve 28, baffles 23*a*, 23*b*, or vanes 27*a*, 27*b*, 27*c*.

FIG. 3 shows an embodiment of a sleeve 60. In this embodiment, an inner diameter of the sleeve 60 is greater than an outer diameter of the inlet portions discussed above—i.e. the sleeve 60 surrounds the inlet portions. A radially inner portion of a leading end 62 of the sleeve 60 is provided with an inclined surface 64 in the form of a chamfer for facilitating movement of the sleeve 60 across the baffles and/or vanes that form the inlet portions or passages. An outer radially portion 66 of the leading end 62 of the sleeve need not comprise an inclined surface, since the outer radially extent is remote from, and will thus not come into contact with, the vanes or baffles.

Figure 6A:
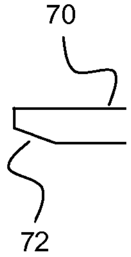
Figure 6B:
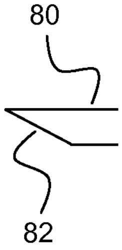
Figure 6C:
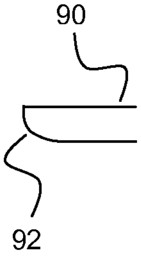

FIGS. 6*a*, 6*b* and 6*c* depict different examples of inclined surfaces that may be used in accordance with embodiments of the present invention. FIG. 6*a* depicts a portion of an object 70 (e.g. a portion of a sleeve, baffle or vane) provided with a chamfer 72. FIG. 6*b* depicts a portion of an object 80 (e.g. a portion of a sleeve, baffle or vane) provided with a bevel 82. FIG. 6*c* depicts a portion of an object 90 (e.g. a portion of a sleeve, baffle or vane) provided with a rounded edge 92.

Figure 6D:
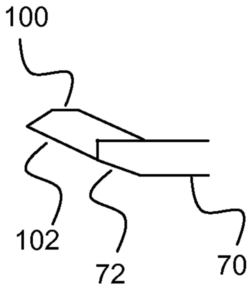

FIG. 6*d* shows that the inclined surface of FIG. 6*a*, for example, could be extended by the provision of a further structure 100 (e.g. a lip, a cap or the like) having or providing a further inclined surface 102.

Figure 6E:
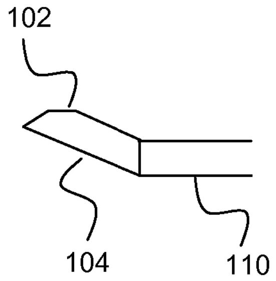

FIG. 6*e* shows an object 110 with no inclined surface. The object 110 can be provided with an inclined surface by the provision of a further structure 112 (e.g. a lip, a cap or the like) having or providing a further inclined surface 114.

Due to manufacturing tolerances, or by deliberate design (e.g. for performance reasons), the baffles and vanes may not have an identical outer radial extent. FIGS. 7 and 8 depict examples where the baffles and vanes do not have the same outer radial extent.

FIG. 7 shows vanes 120 extending, in a radially direction, slightly beyond a radially extent of baffles 122. Because the vanes 120 extend slightly beyond a radially extent of baffles 122, the vanes 120 are more likely to be impacted by, and potentially cause jamming of, a sleeve moving across those vanes 120. For this reason, an extremity of the vanes 120 (at least) is provided with an inclined surface 124 for facilitating movement of the sleeve across vanes 120.

In another embodiment (not shown), and alternatively or additionally, the problem identified in the preceding paragraph may be obviated or mitigated by providing a leading end of the sleeve with one or more discrete (i.e. not extending around the entire circumference of the sleeve) inclined surfaces distributed around a circumference of the sleeve, the location or locations of which coincide with a location of a vane. For example, a plurality or an array of such discrete inclined surfaces may be distributed around a circumference of the leading end of the sleeve to coincide with a plurality or an array of vanes circumferentially distributed around the inlet (e.g. within the inlet portions).

FIG. 8 shows baffles 130 extending, in a radially direction, slightly beyond a radially extent of vanes 132. Because the baffles 130 extend slightly beyond a radially extent of baffles 130, the baffles 130 are more likely to be impacted by, and potentially cause jamming of, a sleeve moving across those baffles 130. For this reason, an extremity of the baffles 130 (at least) is provided with an inclined surface 134 for facilitating movement of the sleeve across baffles 130.

In a different but related embodiment, or sets of embodiments, an outer diameter of the sleeve is less than an inner diameter of the inlet portions discussed above—i.e. the sleeve is surrounded by the inlet portions. A radially outer portion of a leading end of the sleeve may be provided with an inclined surface in the form of a chamfer or the like (e.g. any inclined surface) for facilitating movement of the sleeve across the baffles and/or vanes that form the inlet portions or passages. In this embodiment, or set of embodiments, a portion of the radially inner (as opposed to outer) extremities of the baffles or vanes that are provided with the inclined surfaces, since in these embodiments the sleeve will move over these portions.

The inclined surface may not extend around an entire circumference of the sleeve, or along an entire circumference of an annular baffle, or be provided on each and every vane. Instead, the inclined surface or surfaces may be discrete, and located at appropriate parts or sections of the sleeve and/or baffle, or only on certain vanes. For example, the inclined surface may only need to be provided where there is likely to be (or would otherwise likely to be) opposed (e.g. potentially jamming) contact between the sleeve and baffles and/or vanes.

The inclined surface or surfaces of the vanes or baffles will, in general, be located and/or oriented to face toward a leading end of the sleeve, such that the sleeve is able to ride along and over the inclined surface.

The sleeve 28 in FIG. 2 may form part of a sleeve assembly. The sleeve assembly comprises the sleeve 28 and an actuator for affecting movement of the sleeve 28. The actuator may affect the movement by moving the sleeve 28 in a certain way, or constraining or controlling movement in a certain way. The actuator, or a part thereof, may form a part of, or be provided in or on, the sleeve 28. In accordance with an embodiment of the present invention, a helical interface is present in the sleeve assembly. The helical interface is arranged to induce, in use, helical movement of a part of the sleeve assembly. The helical movement of a part of the assembly (which may be a part of or all of the actuator, or of the sleeve) ensures, or at least promotes, a more uniform distribution of forces on the sleeve during movement of the sleeve, which may assist in ensuring or promoting coaxial movement of the sleeve. Such coaxial movement may reduce the chances of the sleeve abutting against one or more baffles or vanes, which could otherwise result in sticking or jamming of the sleeve. Such sticking or jamming is undesirable.

The sleeve assembly used in FIG. 2 is shown in more detail in FIG. 9. FIG. 9 shows an expanded view of the sleeve assembly. The sleeve assembly comprises the sleeve 28 and an actuator part in the form of a rotatable collar 140. In practice, the rotatable collar 140 completely surrounds the sleeve 28. However, this is not shown in the Figure, for reasons of clarity.

The sleeve 28 is provided with one or more helical ribs 142. An inner surface of the rotatable collar is provided with one or more bearings 144 for engaging with opposing sides of the one or more helical ribs 142. The rotatable collar 140 is fixed in position axially.

In use, the rotatable collar 140 is rotated, for example by another part of the actuator (not shown). Rotation of the rotatable collar 140 causes the one or more helical ribs 144 to move between bearings 144. Because the rotatable collar 140 is fixed in position axially, and because the one or more ribs 142 are helical, rotation of the rotatable collar 140 causes helical movement of the sleeve 28.

FIG. 10 depicts an expanded view of another embodiment of a sleeve assembly. The sleeve assembly comprises a sleeve 150 and a first actuator part in the form of a rotatable collar 152 that is fixed in position axially. The rotatable collar 152 is provided with one or more helical grooves or slits 154. The sleeve 150 is also provided with one or more helical grooves or slits 156. The helical grooves or slits 154 of the rotatable collar 152 have the same handedness as those helical grooves or slits 156 of the sleeve 150.

Disposed in-between the rotatable collar 152 and the sleeve 150 is a second part of the actuator in the form of an annulus 158. The annulus 158 houses one or more bearings 160 configured to sit in the one or more helical grooves or slits 154 of the rotatable collar 152, and to also sit in the helical grooves or slits 156 provided in the sleeve 150.

In use, the rotatable collar 152 is rotated, for example by another part of the actuator (not shown). Rotation of the rotatable collar 152 causes the annulus 158 to move in a helical and/or axial direction, due to the bearings 160 moving in the helical grooves or slits 154 of the collar 152. Such movement of the annulus 158, in turn, causes movement of the sleeve 150, due to the bearings 160 moving in the helical grooves or slits 156 of the sleeve 150 and the same handedness of the helical grooves or slits 154, 156. If movement of the sleeve 150 is not guided in some way, the sleeve 150 may simply rotate with the annulus 158. Thus, the sleeve assembly may further comprise a guide for guiding (which includes restraining) movement of the sleeve 150 in an axial and/or helical manner.

In practice, the rotatable collar 152 completely surrounds the annulus 158, which completely surrounds the sleeve 50. However, this is not shown in the Figure, for reasons of clarity.

FIG. 11 depicts expanded views of another embodiment of a sleeve assembly, in three stages of operation. The sleeve assembly comprises a sleeve 170 and a first actuator part in the form of a collar 172 that is fixed in position. The collar 172 is provided with one or more helical grooves or slits 174. The sleeve 170 is also provided with one or more helical grooves or slits 176. The helical grooves or slits 174 of the collar 172 have a different handedness to those helical grooves or slits 176 of the sleeve 170.

Disposed in-between the collar 172 and the sleeve 170 is a second part of the actuator in the form of an annulus 178. The annulus 178 houses one or more bearings 180 configured to sit in the one or more helical grooves or slits 174 of the collar 172, and to also sit in the helical grooves or slits 176 provided in the sleeve 170.

In use, the sleeve 170 is driven axially, for example by another part of the actuator, e.g. push rods or the like (not shown). Movement of the sleeve 170 causes the annulus 178 to move in a helical and/or axial direction, due to the bearings 180 moving in the helical grooves or slits 174 of the collar 172 and the helical grooves or slits 176 of the sleeve 170 itself. Movement of the bearings with the annulus, together with the different handedness of the helical grooves or slits 174 of the collar 172 and the helical grooves or slits 176 of the sleeve 170, causes a driving force applied to the sleeve 170 to be uniformly distributed around the sleeve 170.

In practice, the collar 172 completely surrounds the annulus 178, which completely surrounds the sleeve 170. However, this is not shown in the Figure, for reasons of clarity.

In any of the embodiment, one or more of the collar, rotatable collar and/or sleeve may be provided with a plurality of helical grooves or slits, disposed (e.g. equally) around a circumference of the respective collar, rotatable collar and/or sleeve. This may improve, or further improve, the equalisation of the distribution of driving or movement related forces around the sleeve.

Various apparatus, and components thereof, have been described for reducing or eliminating contact between structures defining axially offset inlet portions (e.g. baffles, vanes, or other structures). FIG. 12 shows an alternative or additional way in which this result may be achieved.

FIG. 12 schematically depicts a cylindrical sleeve structure 190 in accordance with an embodiment of the present invention. The cylindrical sleeve structure 190 is axially movable across the annular inlet discussed above to vary the size of a gas flow path through the inlet. The cylindrical sleeve structure 190 extends across the entire width of the inlet, such that a first end of the sleeve structure 192 is supported within or by the first inlet side wall, or a body defining that wall, and a second opposite end of the sleeve structure 194 is supported within or by the second sidewall, or a body defining that wall. Supporting the sleeve structure 190 at both sides of the inlet limits or reduced the chances of the sleeve structure coming into contact with a structure in the inlet.

The sleeve structure 190 comprises one or more apertures 196 (e.g. apertures with an axial extent) locatable within the inlet to, upon movement of the sleeve structure 190, vary the size of a gas flow path through the inlet. This may include moving the sleeve structure 190 to align the apertures 196 with inlet portions or passageways defined in the inlet.

The sleeve structure 190 may be alternatively or additionally described as comprising a sleeve structure that has been provided with, of formed with the one, or more apertures.

The sleeve structure 190 may be alternatively or additionally described as comprising a first sleeve section 192, and a second sleeve section 194, the first and second sleeve sections being joined and axially separated by one or more (e.g. axially extending) support struts 198. The one or more support struts 198 may be attached to the sleeve sections 192, 194. However, if the one or more support struts 198 are integral to (e.g. formed integrally with) the sleeve sections 192, 194, the overall sleeve structure may be more rigid and mechanically robust.

In alternative embodiments (see FIGS. 13 to 15) a single sleeve section 200, 204 may be provided with one or more support struts 202, 206. The sleeve section 200, 204 may be supported within or by the first inlet side wall, or a body defining that wall, and the struts 202, 206, whose ends directed towards the second sidewall may be free (as in FIG. 13) or may be linked via a ring 208 (see FIGS. 14 and 15), may be supported within or by the second sidewall, or a body defining that wall. Two axially separated sleeve sections may, however, be preferable, so that the size of the inlet can be controlled by bringing either of the sleeve sections into the inlet to control the size thereof. This may facilitate the control of the size of the inlet from either side thereof, which may provide additional functionality. Alternatively or additionally, the use of two sleeve sections, with an appropriate spacing defined therebetween, may allow for a particular inlet portion or passage thereof to be opened or closed in a selective manner by movement of the sleeve structure as a whole.

It will be appreciated that if struts are employed, apertures may be defined between the struts, or within and/or through the struts.

Struts, or any structure surrounding or defining the aforementioned apertures, may undesirably affect the flow of gas through the inlet. To minimise this undesirable effect, the struts or structures may be aligned with (or more generally, alignable with) leading or trailing edges of vanes or other structures (preferably axially extending) provided in one or both inlet portions or passages in those portions.

A vane may be any structure that divides an inlet portion into one or more inlet passages. The vane may preferably be defined as any structure that can direct gas flow in a particular direction, for example in accordance with a desired swirl angle or angle of attack or the like.

Preferentially, the sleeve surrounds the inlet portions, which has been found to give an improved aerodynamic performance. In other words, the inner diameter of the sleeve is greater than an outer diameter (or outer radial extent) of the inlet portion or portions. In another embodiment, the sleeve may be surrounded by the inlet portions. In other words, the outer diameter of the sleeve may be less than inner diameter of the inlet portion or portions. In another embodiment, the sleeve may be moveable through the inlet portion or portions. In other words, the diameter (e.g. inner or outer, or average diameter) of the sleeve may be less than an outer diameter of the inlet portion or portions, and greater than an inner diameter of the inlet portion or portions.

Any one or more of the above embodiments, or features thereof, may be combined with other embodiments, or features thereof, where appropriate.

Typically, exhaust gas flows to the annular inlet from a surrounding volute or chamber. The annular inlet is therefore defined downstream of the volute, with the downstream end of the volute terminating at the upstream end of the annular inlet. As such, the volute transmits the gas to the annular inlet, while the gas inlet passages or portions of the present invention receive gas from the volute. In some embodiments, the first and second inlet sidewalls which define the annular inlet are continuations of walls which define the volute. The annular inlet may be divided into at least two axially offset inlet passages or portions by one or more baffles located in the annular inlet, and which are therefore positioned downstream of the volute.

The turbine of the present invention has been illustrated in the Figures using a single flow volute, however it is applicable to housings that are split axially, whereby gas from one or more of the cylinders of an engine is directed to one of the divided volutes, and gas from one or more of the other cylinders is directed to a different volute. It is also possible to split a turbine housing circumferentially to provide multiple circumferentially divided volutes, or even to split the turbine housing both circumferentially and axially. It should be appreciated, however, that an axially or circumferentially divided volute is distinguished from the multiple gas inlet passages or portions present in the turbine of the present invention. For example, the gas inlet passages or portions relate to a nozzle structure arranged to accelerate exhaust gas received from the volute towards the turbine, and optionally to adjust or control the swirl angle of the gas as it accelerates. The multiple gas inlet passages or portions forming part of the present invention may be further distinguished from a divided volute arrangement in that, while the gas inlet passages or portions receive gas from the volute (or divided volute), and split the gas into an array of paths directed on to the turbine, a divided volute receives gas from the exhaust manifold so as to retain the gas velocity in gas pulses resulting from individual engine cylinder opening events.

It will be appreciated that axially offset inlet passages or portions include inlet passages or portions with different axial positions and/or inlet passages with different axial extents. Axially offset inlet passages or portions may be spaced apart, adjacent or axially overlapping.

The invention claimed is:

1. A variable geometry turbine comprising:

a turbine wheel mounted for rotation about a turbine axis within a housing, the housing defining an annular inlet surrounding the turbine wheel and defined between first and second inlet sidewalls, the annular inlet being divided into at least two axially offset inlet portions;

a cylindrical sleeve axially movable across the annular inlet to vary the size of a gas flow path through the inlet; and a guide for guiding the movement of the cylindrical sleeve, the guide being at least partially located within the inlet at a radially extent of the inlet portions, and extending in an axial direction parallel to the turbine axis; wherein the guide comprises one or more elongate members; and wherein the elongate members are located at an outer radially extent of the inlet portions if the sleeve has an inner diameter that is greater than an outer diameter of inlet portions.

2. The variable geometry turbine of claim 1, wherein the elongate members are located at an inner radially extent of the inlet portions if the sleeve has an outer diameter that is less than an inner diameter of inlet portions.

3. A variable geometry turbine comprising:

a turbine wheel mounted for rotation about a turbine axis within a housing, the housing defining an annular inlet surrounding the turbine wheel and defined between first and second inlet sidewalls, the annular inlet being divided into at least two axially offset inlet portions;

a cylindrical sleeve axially movable across the annular inlet to vary the size of a gas flow path through the inlet; and a guide for guiding the movement of the cylindrical sleeve, the guide being at least partially located within the inlet at a radially extent of the inlet portions, and extending in an axial direction parallel to the turbine axis;

one or more vanes located in one or both inlet portions, the one or more vanes dividing an inlet portion into at least two inlet passages, and wherein the guide comprises:

one or more edges of the one or more vanes.

4. The variable geometry turbine of claim 3, wherein, if the sleeve has an inner diameter greater than an outer diameter of the inlet portions, the one or more edges is a leading edge, or are leading edges, of the one or more vanes.

5. The variable geometry turbine of claim 3, wherein, if the sleeve has an outer diameter that is less than an inner diameter of the inlet portions, the one or more edges is a trailing edge, or are trailing edges, of the one or more vanes.

6. A variable geometry turbine comprising:

a turbine wheel mounted for rotation about a turbine axis within a housing, the housing defining an annular inlet surrounding the turbine wheel and defined between first and second inlet sidewalls, the annular inlet being divided into at least two axially offset inlet portions;

a sleeve assembly, comprising a sleeve that is movable in a direction parallel to the turbine axis and across the annular inlet to vary the size of a gas flow path through the inlet, and an actuator for affecting movement of the sleeve;

wherein a helical interface is present in the sleeve assembly, the helical interface being arranged to induce, in use, helical movement of a part of the sleeve assembly; wherein at least a part of the actuator comprises the helical interface, and the sleeve is arranged to move axially, and/or helically.

7. The variable geometry turbine of claim 6, wherein the sleeve comprises a helical groove or slit, and the actuator comprises:

a rotatable collar that surrounds, or is surrounded by, the sleeve, the rotatable collar being fixed in position in an axial direction, and the rotatable collar being provided with a helical groove or slit; and a helically or axially moveable annulus located in-between the sleeve and the rotatable collar, the annulus housing one or more bearings configured to sit in the helical groove or slit of the rotatable collar, and to sit in the helical groove or slit provided in the sleeve, the helical groove or slit of the sleeve, and the helical groove or slit of the rotatable collar, having different handedness.

8. The variable geometry turbine of claim 6, wherein the sleeve comprises a helical groove or slit, and the actuator comprises:

a collar that surrounds, or is surrounded by, the sleeve, the collar being fixed in position, and the collar being provided with a helical groove or slit; and a helically moveable annulus located in-between the sleeve and the collar, the annulus housing one or more bearings configured to sit in the helical groove or slit of the rotatable collar, and to sit in the helical groove or slit provided in the sleeve, the helical groove or slit of the sleeve, and the helical groove or slit of the collar, having the same handedness.

9. The variable geometry turbine of claim 7 or claim 8, wherein one or more of the collar, rotatable collar and/or sleeve comprise a plurality of helical grooves or slits, disposed around a circumference of the respective collar, rotatable collar and/or sleeve.

* * * * *